United States Patent Office 3,839,536
Patented Oct. 1, 1974

3,839,536
PROCESS FOR PREPARING PURE
HYDRATED ALUMINA
Shozo Sato, Yamato, and Yoshihisa Otaka and Kenji Mori, Tokyo, Japan, assignors to Mitsubishi Chemical Industries, Ltd., Tokyo, Japan
No Drawing. Filed July 21, 1971, Ser. No. 164,832
Int. Cl. C01f 7/14, 7/46
U.S. Cl. 423—132                 6 Claims

ABSTRACT OF THE DISCLOSURE

Pure hydrated alumina is prepared by heating a slurry containing bayerite, prepared by charging carbon dioxide into aqueous solution of sodium aluminate and washing with water, under pressure with carbon dioxide to elute the sodium component and then separating hydrated alumina from the slurry. Bayerite and boehmite are prepared.

BACKGROUND OF THE INVENTION

Field of the Invention

This invention relates to a process for preparing pure hydrated alumina, and more particularly to a process for preparing pure bayerite ($Al_2O_3 \cdot 3H_2O$) or boehmite ($Al_2O_3 \cdot H_2O$).

Description of Prior Art

Crystalline aluminum hydroxide, i.e., bayerite, is a form of a hydrated alumina which is prepared conventionally by rapidly hydrolyzing sodium aluminate. This technique results, however, in the formation of a significant amount of sodium components as impurities in the product. A pure bayerite having a lower sodium content can be prepared by repeatedly washing with water, many times and it can be prepared by adding a water soluble organic solvent, such as an alcohol or an ether, to an aqueous solution of sodium aluminate, and then charging carbon dioxide gas to separate bayerite, but it has been impossible to decrease the content of the sodium components to less than 0.4%. Moreover, sodium impurity removal requires an extended period of time, because such impurities are often occluded within the internal crystalline structure which prevents removal by simple water washing. While the use of water soluble organic solvents is quite effective for the removal of sodium component impurities, such large amounts of organic solvents are expensive and the particle size of the resulting bayerite is quite small, as low as $0.01$–$0.2\mu$. Moreover, the organic solvents are usually not effective for the removal of many organic impurities.

Another method which has been suggested for preparing boehmite is to add ammonium carbonate, ammonium acid carbonate or ammonia to an aqueous solution of aluminum salts, such as aluminum chloride or aluminum nitrate, to yield a hydrated alumina gel. In the alternative, an organo aluminum compound such as aluminum alkoxide, can be hydrolyzed with acid or steam to yield an alumina gel. The resulting alumina gel is then steamed at 200° C.–250° C. Still another technique for preparing boehmite has been to heat Hydragillit ($Al_2O_3 \cdot 3H_2O$)

or Bayerite ($Al_2O_3 \cdot 3H_2O$) at 200–300° C. to cause dehydration.

In the former method, involving heating of an alumina gel, it is difficult to produce a large amount of product economically, because of the difficulty of handling the alumina gel. Moreover, it has been found that impurities having an acid radical will remain in the resulting boehmite.

In the latter method, involving the use of Hydragillit or Bayerite, it has been found that a large quantity of sodium component impurities will remain in the product.

Accordingly, when alumina, obtained by calcining bayerite or boehmite, prepared by those conventional methods, is used as a catalyst, carrier, adsorbent, or raw material in the formation of alumina glass, the property of the resulting product is often adversely affected by the impurities.

SUMMARY OF THE INVENTION

Accordingly, it is an object of this invention to provide an economical, industrially acceptable process for preparing the bayerite form, and the boehmite form of hydrated alumina, which contains only small quantities of sodium component impurities.

This and other objects have now been attained by providing a process for preparing pure hydrated alumina by charging carbon dioxide into an aqueous solution of sodium aluminate to yield a hydrated alumina, washing the resulting hydrated alumina, heating a slurry of hydrated alumina at 100–300° C. under the pressure of carbon dioxide, and then separating the hydrated alumina.

DETAILED DESCRIPTION OF PREFERRED EMBODIMENT

The aqueous sodium aluminate solution used for the process of this invention is preferably an aqueous solution of sodium aluminate prepared by dissolving bauxite ore into a caustic soda solution. However, it is possible to employ an aqueous solution of sodium aluminate by redissolving a hydrated alumina, prepared by the Bayer method into a caustic soda solution, or by dissolving aluminum metal into a caustic soda solution.

Iron ore components in the bauxite, are precipitated as colloidal iron hydroxide, and are freed in the upper phase of the aqueous sodium aluminate solution. This iron hydroxide precipitate can be separated by decantation or any other suitable process so as to decrease the iron content in the hydrated alumina to less than 10 p.p.m.

When carbon dioxide is charged into the aqueous sodium aluminate solution, bayerite is precipitated out to yield a bayerite slurry. The resulting bayerite slurry contains a large amount of sodium bicarbonate, sodium carbonate, sodium hydroxide, sodium aluminate and other sodium salts in the liquid phase. Since some sodium components are adsorbed onto the surface of the bayerite particles, it is desirable to wash the slurry particles with desalted water, such as pure water treated with an ion-exchange resin, prior to the treatment with carbon dioxide. The pH of the initial bayerite slurry is usually higher than 13, and accordingly, the washing operation is carried out by decantation or other suitable process, repeatedly until the pH is reduced to 12 or less and preferably less than 10.

It is also possible to remove other impurities from the bayerite, such as Si, Mg, Ca, etc., by said washing, so that the total content of impurities can be decreased to less than 10 p.p.m.

Characteristic of the invention, is the heat treatment of the bayerite slurry at a specific, high temperature under carbon dioxide pressure.

The pressure of the carbon dioxide depends upon the temperature and heating time period. It is usual to charge about 10–20 kg./cm.$^2$ of carbon dioxide in the autoclave and then to heat the autoclave to a suitable temperature.

When the temperature is too low, the effective results of this invention cannot be attained. On the other hand, when the temperature is too high, the pressure of carbon dioxide will be increased and expensive apparatus will be required to retain the carbon dioxide, yet the increase in effect will be small. Accordingly, it is preferable to heat at temperatures of between 100° C.–300° C.

If the bayerite slurry is heated above 170° C., the bayerite is converted to boehmite. Accordingly, boehmite may also be obtained by the techniques of this invention.

The concentration of bayerite in the slurry is preferably less than 30%, and the treatment of the bayerite with carbon dioxide at high temperature is preferably carried out, while stirring.

The heat treatment, under pressure with carbon dioxide, causes the sodium components, occluded within the crystal and adsorbed on the surface of the bayerite particles, to be converted into sodium bicarbonate and hence, are easily eluted.

The resulting slurry is cooled and filtered and washed with a desalted water to remove all of the sodium components and is dried. When the drying temperature is too high, the bayerite will be converted into boehmite in the drying step. Accordingly, when bayerite is desired, it is preferable to dry the slurry particles at temperatures of under 90° C.

A high purity alumina can be obtained by dehydrating the resulting hydrated alumina under heat wherein the $\gamma$-alumina is obtained by heating at 550°–900° C., $\delta$-alumina is obtained at 900–1000° C., $\theta$-alumina is obtained at 1000–1200° C., and $\alpha$-alumina is obtained at temperatures above 1200° C.

In accordance with the process of this invention, it is possible to easily obtain high purity hydrated alumina containing lower contents of sodium components than can be produced by any conventional process. The content of sodium in the resulting bayerite can be reduced to about 0.05 weight percent and the content of sodium in the resulting boehmite can be reduced to less than 0.005 weight percent. Accordingly, the various types of alumina obtained by calcining the resulting hydrated alumina will contain no $\beta$-alumina ($11Al_2O_3 \cdot Na_2O$).

Since the hydrated alumina particles are not easily crushed during the process, it is also possible to prepare hydrated alumina with relatively large particle size.

Generally speaking, alumina prepared from alumina salts contains acid residue, while alumina from aluminate contains sodium. By our process, an alumina which contains neither an acid residue nor sodium can be obtained.

Due to the high purity, the hydrated alumina of this invention, is quite useful for preparing catalyst carriers, column packing for chromatography, electrical insulation, alumina glass tube for sodium lamps and artificial jewels, etc.

Having now generally described the invention, a further understanding can be obtained by reference to certain specific examples which are not intended to be limiting unless otherwise specified.

In these examples, the specific surface area was measured by nitrogen adsorption methods, and the pore size distribution was calculated from the data measured by a 60,000 p.s.i. mercury porosimeter, assuming surface tension of mercury=480 dyne/cm. and contact angle between alumina or hydrated alumina and mercury=140°.

Example 1

A slurry containing about 2.6 kg. of bayerite precipitated by charging carbon dioxide into an aqueous solution of sodium aluminate prepared by the Bayer method, was treated and was placed into a beaker made of polyethylene.

The slurry was permitted to settle as a sediment of the bayerite and supernatant liquid was removed. Pure water, treated with an ion exchange resin, was added to the bayerite while stirring to make about 17 liters of a slurry. The slurry was again settled and the supernatant liquid was removed. The washing operation was repeated for 7 times until a pH of 10.5 was obtained. 17 liters of the slurry was charged into a 25 liter autoclave, in which the air was replaced with carbon dioxide.

In the autoclave, carbon dioxide was further charged to a gauge pressure of 15 kg./cm.$^2$, and the slurry was heated to 200° C. while stirring and was kept for 3 hours. After cooling, the slurry was filtered and the precipitate was washed with about 20 liters of deionized water and was dried.

The pH of the slurry after final washing, was 6.4. 1.94 kg. of boehmite was obtained on a dry base and was found to have a 0.93 g./ml. bulk density, a specific surface area of 10.8 m./g., about 79% of 250–400 mesh particles, a pore volume of 0.45 ml./g. of pores having a radius of from 18 to 75,000 A., a pore volume of 0.30 ml./g. for those pores having a radius of from 18 to 10,000 A. and less than 0.005% of sodium content, measured as Na.

$\gamma$-Alumina prepared by calcining the boehmite at 550° C. for 2 hours was a neutral alumina having a specific surface area of 102.7 m.$^2$/g., a pore volume of 0.81 ml./g. for pores having a radius of from 18 to 75,000 A. and a pore volume of 0.43 ml./g. for pores having radius of from 18–10,000 A.

$$\left(\begin{array}{l}\text{Pores having 18 A.–75,000 A. radius . . . broad range} \\ \text{Pores having 18 A.–10,000 A. radius . . . narrow range}\end{array}\right)$$

Example 2

A slurry containing about 3.7 kg. of bayerite containing the impurities Na: 0.62%; Si: 0.1%; Hg: 0.03%; Fe: 0.01%; Mn, Cu, Ti, Ga: 0.003%, by weight. $Al_2O_3$ of Example 1 was washed by decantation to a pH of 10.5. 17 liters of the slurry was charged to a 25 liter autoclave, in which air was replaced with carbon dioxide. In the autoclave, carbon dioxide was further charged to a gauge pressure of 15 kg./cm.$^2$, and the slurry was heated to 200° C. while stirring and was kept for 10 hours. After cooling, the slurry was filtered and the precipitate was washed with about 20 liters of deionized water and was dried.

2.76 kg. of boehmite was obtained on a dry base and was found to have a bulk density of 0.91 g./ml., a specific surface area of 10.1 m.$^2$/g., about 76% of 250–400 mesh particles, a pore volume of 0.46 ml./g. for pores having a radius of from 18 to 75,000 A., and a pore volume of 0.29 ml./g. for pores having a radius of from 18 to 10,000 A., and less than 0.005% of sodium content measured as Na.

$\alpha$-alumina prepared by calcining the boehmite at 1500° C. was a neutral alumina having 0.03% of Si, 0.01% of Fe and Mg, 0.003% of Ga and 0.001% of Ti, without any $\beta$-alumina.

Example 3

A slurry containing about 3 kg. of bayerite, precipitated by charging carbon dioxide into an aqueous solution of sodium aluminate, prepared by the Bayer method, was placed into a beaker made of polyethylene.

The slurry was allowed to settle as a sedimentate, and the bayerite and supernatant liquid was removed. Pure water, treated with an ion exchange resin was added to the bayerite, while stirring to make about 17 liters of a slurry. The slurry was again allowed to settle and the supernatant liquid was removed. This washing operation was repeated 7 times to obtain a pH of 10.6.

17 liters of the slurry was charged to a 25 liter autoclave in which air was replaced with carbon dioxide. Carbon dioxide was further charged to the autoclave to a gauge pressure of 10 kg./cm.$^2$. The slurry was heated to 170° C. while stirring and was kept for 5 hours. After cooling, the slurry was filtered and the precipitate was washed with about 20 liters of deionized water and was dried at about 50–60° C. The pH of the slurry, after the final washing, was 6.4.

The resulting bayerite was found to have a bulk density of 1.32 g./ml., a specific surface area of 0.2 m.$^2$/g., 81% of 200–325 mesh of particles, a pore volume of 0.21 ml./g. for pores having a radius of from 18 to 75,000 A., and a pore volume of 0.008 ml./g. pores having a radius of from 18–10,000 A. and 0.059% of sodium component measured as Na.

The resulting bayerite was heated at 550° C. to prepare γ-alumina having a specific surface area of 293 m.²/g.

Example 4

A slurry containing about 2.5 kg. of bayerite of Example 3 was washed by decantation 6 times until the pH was 10.9. 17 liters of the slurry was charged to a 25 liter autoclave in which air was replaced with carbon dioxide. In the autoclave, carbon dioxide was further charged to a gauge pressure of 12 kg./cm.² and the slurry was heated to 140° C., while stirring, and was kept for 1 hour. After cooling, the slurry was filtered and the precipitate was washed with about 20 liters of pure water, and was dried at 50–60° C.

The resulting bayerite was found to have a bulk specific gravity of 1.34 g./ml., a specific surface area of 1.1 m.²/g., 85% of 200–325 mesh of particles, a pore volume for pores having radius of from 18 to 75,000 A. 0.25 ml./g., a pore volume for pores having radius of from 18 to 10,000 A. of 0.009 ml./g. and a sodium content of 0.09%, measured as Na.

Having now fully described the invention, it will be apparent to one of ordinary skill in the art, that many changes and modifications can be made thereto without departing from the spirit or scope of the invention.

What is claimed and is desired to be secured by Letters Patent of the United States is:

1. A process for preparing a hydrated alumina, which comprises:
    forming a slurry of bayerite by charging carbon dioxide into an aqueous solution of sodium aluminate;
    washing the particles of said slurry with water until a pH of 12 or less is obtained;
    heating said slurry at a temperature of 100°–300° C. while under a gauge pressure of $CO_2$ of 10–20 kg./cm.² which is sufficient to elute the sodium component; and thereafter
    separating hydrated alumina from the slurry.

2. The process according to claim 1, wherein the slurry is heated to 100–170° C. under pressure of carbon dioxide to prepare pure bayerite.

3. The process according to claim 1, wherein the slurry is heated to 180–300° C. under pressure of carbon dioxide to prepare pure boehmite.

4. The process according to claim 1, wherein the amount of bayerite particles in the slurry is less than 30%.

5. The process according to claim 1, wherein the slurry containing bayerite is prepared by charging carbon dioxide into an aqueous solution of sodium aluminate, which is prepared by dissolving an aluminum compound selected from the group consisting of bauxite ore, hydrated alumina, and aluminum metal in a caustic soda solution, and then washing the particles of said slurry with water to reduce the pH to less than 12.

6. The process for preparing pure hydrated alumina according to claim 5, wherein the slurry containing bayerite is prepared by washing a precipitate prepared by reacting carbon dioxide with sodium aluminate.

References Cited

UNITED STATES PATENTS

| | | | |
|---|---|---|---|
| 2,774,744 | 12/1956 | Barrett et al. | 423—132 X |
| 691,470 | 1/1902 | Jordan | 423—630 |
| 2,390,272 | 12/1945 | Riesmeyer et al. | 423—132 |
| 3,568,840 | 3/1971 | Hashimoto | 423—628 X |
| 3,714,343 | 1/1973 | Sato et al. | 423—630 X |
| 3,268,295 | 8/1966 | Armbrust, Jr. et al. | 23—143 X |
| 2,894,915 | 7/1959 | Keith | 23—143 X |
| 2,247,624 | 7/1941 | Wall | 23—143 |

OTHER REFERENCES

Newsome et al., "Alumina Properties," 2nd Revision, 1960, pp. 62, 63.

Ehret, "Smith's College Chemistry," 6th Edition, 1946, pp. 383–384.

MILTON WEISSMAN, Primary Examiner

U.S. Cl. X.R.

423—131, 630; 252—463, 63.5; 106—47